(12) United States Patent
Baumgaertner et al.

(10) Patent No.: US 8,123,938 B2
(45) Date of Patent: Feb. 28, 2012

(54) FILTER DEVICE FOR FILTERING A LIQUID AND FILTER ELEMENT FOR SUCH A FILTER DEVICE

(75) Inventors: Reinhard Baumgaertner, Karlsdorf-Neuthard 2 (DE); Dietmar Weik, Bruchsal (DE); Matthias Jung, Walzbachtal-Joehlingen (DE); Thomas Weiser, Sinsheim (DE)

(73) Assignee: ARGO-HYTOS GmbH, Kraichtal (DE)

( * ) Notice: Subject to any disclaimer, the term of this patent is extended or adjusted under 35 U.S.C. 154(b) by 450 days.

(21) Appl. No.: 12/322,512

(22) Filed: Feb. 2, 2009

(65) Prior Publication Data

US 2009/0200223 A1  Aug. 13, 2009

(30) Foreign Application Priority Data

Feb. 8, 2008  (EP) .................................... 08002381

(51) Int. Cl.
*B01D 27/00* (2006.01)
(52) U.S. Cl. ....................... 210/232; 210/416.5; 210/450
(58) Field of Classification Search .................. 210/232, 210/416.1, 416.5, 437, 440, 443, 450, 457
See application file for complete search history.

(56) References Cited

U.S. PATENT DOCUMENTS 5,643,448 A * 7/1997 Martin et al.
(Continued)

FOREIGN PATENT DOCUMENTS

EP        0 532 161    * 3/1993
(Continued)

*Primary Examiner* — Fred Prince
(74) *Attorney, Agent, or Firm* — Lipsitz & McAllister, LLC (57) ABSTRACT

The invention relates to a filter device for filtering a liquid, in particular, a hydraulic oil, comprising a filter housing having a least one inlet for liquid to be filtered and at least one outlet for filtered liquid, a filter element positioned in the flow path of the liquid between the inlet and the outlet, and a sealing device having a sealing element and a first sealing surface, the sealing element in a sealing position being positioned in a sealing manner on the first sealing surface. In order to further develop the filter device in such a way that the sealing element also lies reliably on the first sealing surface under alternating pressure loads, it is proposed, in accordance with the invention, that the filter device comprise a locking device, and the sealing element be adapted to be locked in its sealing position at least in the axial direction relative to the first sealing surface by means of the locking device. A filter element for the filter device is also proposed.

39 Claims, 5 Drawing Sheets

U.S. PATENT DOCUMENTS

| | | | |
|---|---|---|---|
| 6,139,739 A * | 10/2000 | Hamlin et al. | |
| 6,500,335 B2 * | 12/2002 | Janik et al. | |
| 6,605,210 B2 * | 8/2003 | Reinhardt | |
| 6,695,891 B2 * | 2/2004 | Reid | |
| 6,740,234 B1 * | 5/2004 | Williams et al. | |
| 6,843,911 B2 * | 1/2005 | Janik et al. | |
| 7,022,228 B2 * | 4/2006 | Hennes et al. | |
| 7,094,343 B2 * | 8/2006 | Moessinger et al. | |
| 2001/0042709 A1 * | 11/2001 | Janik | |
| 2002/0170852 A1 * | 11/2002 | Reinhardt | |
| 2003/0010697 A1 * | 1/2003 | Sann et al. | |
| 2003/0038073 A1 * | 2/2003 | Fall et al. | |
| 2004/0031745 A1 * | 2/2004 | Moessinger et al. | |
| 2004/0182777 A1 * | 9/2004 | Stankowski et al. | |
| 2006/0091064 A1 * | 5/2006 | Brown et al. | 210/450 |

FOREIGN PATENT DOCUMENTS

| | | | |
|---|---|---|---|
| EP | 295 02 895 | | 6/1995 |
| EP | 0 691 876 | * | 1/1996 |
| EP | 0 783 361 | * | 7/1997 |
| EP | 0 917 900 | * | 5/1999 |
| EP | 1 042 046 | * | 10/2000 |
| EP | 100 06 327 | | 8/2001 |
| EP | 1 242 747 | | 9/2002 |
| EP | 1 326 693 | | 7/2003 |
| EP | 103 13 239 | | 9/2004 |
| EP | 10 2005 041 717 | | 4/2006 |
| WO | 00/21640 | | 4/2000 |
| WO | 01/80967 | | 11/2001 |
| WO | 2005/061073 | | 7/2005 |

* cited by examiner

FILTER DEVICE FOR FILTERING A LIQUID AND FILTER ELEMENT FOR SUCH A FILTER DEVICE

The present disclosure relates to the subject matter disclosed in European patent application number 08 002 381.5 of Feb. 8, 2008, which is incorporated herein by reference in its entirety and for all purposes.

BACKGROUND OF THE INVENTION

The invention relates to a filter device for filtering a liquid, in particular, a hydraulic oil, comprising a filter housing having a least one inlet for liquid to be filtered and at least one outlet for filtered liquid, a filter element positioned in the flow path of the liquid between the inlet and the outlet, and a sealing device having a sealing element and a first sealing surface, the sealing element in a sealing position being positioned in a sealing manner on the first sealing surface for sealing off a dirt area arranged upstream of the filter element for liquid to be filtered from a clean area arranged downstream of the filter element for filtered liquid.

The invention also relates to a filter element for such a filter device.

Filter devices of the kind mentioned at the outset are used in a large number of applications in hydraulic systems, in particular, in automotive machines such as, for example, construction machinery or agricultural machines. In particular, mineral oils for hydraulic systems can be filtered with such filter devices. The hydraulic systems have to satisfy very high demands with regard to the cleanliness of the hydraulic oil, so that they can fulfill their function without faults and with little wear over prolonged operating times. Since the filter element gradually becomes blocked with dirt particles during the operating time, it is usually mounted exchangeably in the filter housing. The filter housing may, for example, be of two-part design and have a filter head comprising the at least one inlet and/or the at least one outlet, and a filter pot which is connectable to the filter head with at least one sealing element placed between these. The filter head has an insertion opening through which the filter element is insertable into the filter housing and which is closable by a cover.

The filter element is arranged in the flow path of the liquid between the inlet and the outlet, so that the liquid flowing in through the inlet can flow through the filter element and thereby be filtered and then leave the filter housing through the at least one outlet.

In order to separate the dirt area arranged upstream of the filter element, which receives the liquid to be filtered, from the clean area arranged downstream of the filter element, which receives the filtered liquid, a sealing device is used, which has a sealing element which in a sealing position is positioned in a sealing manner on an associated first sealing surface. The sealing element may, for example, be arranged on an end plate of the filter element. This is known from EP 1 326 693 B1.

During operation of the filter device, the filter element is often acted upon by alternating pressure loads, and it is, therefore, necessary to ensure that the sealing element lies in a sealing manner on the associated first sealing surface.

It is an object of the present invention to further develop a filter device of the kind mentioned at the outset in such a manner that the sealing element also lies reliably on the first sealing surface under alternating pressure loads.

SUMMARY OF THE INVENTION

This object is accomplished in accordance with the invention in a filter device of the generic kind in that the filter device comprises a locking device, and the sealing element in its sealing position is adapted to be locked at least in the axial direction relative to the first sealing surface by means of the locking device.

The invention incorporates the concept that by providing a locking device the sealing element can be reliably held on the first sealing surface, and even under alternating pressure loads to which the filter element may be exposed during operation of the filter device, the sealing element is fixable at least in the axial direction relative to the first sealing surface. Therefore, after it has assumed its sealing position, the sealing element can no longer be moved at least in the axial direction relative to the first sealing surface.

In this connection, it is advantageous for the sealing element to be adapted to be clamped to the first sealing surface by means of the locking device. The sealing element can thus be clamped to the first sealing surface by being transferred to its sealing position. The sealing element therefore also exerts a force on the associated first sealing surface in the absence of pressure load on the filter element, i.e., the sealing element is under pretension, which in any case ensures that it lies in a sealing manner on the associated first sealing surface, and it is ensured by the locking device that the sealing element is unable to move in the axial direction relative to the sealing surface.

It is expedient for the sealing element to be configured as a sealing lip, as this enables a particularly reliable sealing-off of the dirt area from the clean area of the filter.

Preferably, the filter element comprises a filter material which, in particular, is folded in the shape of a star and has an end plate arranged at its upper and/or lower end face. The liquid flows through the filter material in a radial direction, i.e., radially from the inside outwards or radially from the outside inwards, and the first sealing surface or the sealing element is arranged on an end plate. The first sealing surface or the sealing element is preferably positioned on the upper end plate facing the inlet of the filter housing. It may, however, also be provided that the first sealing surface or the sealing element is arranged on the lower end plate of the filter element facing away from the inlet.

The first sealing surface or the sealing element is expediently connected with a substance-to-substance bond or integrally to the end plate. For example, the sealing element may be adhesively bonded or welded to the end plate. An integral configuration of sealing surface or sealing element and end plate such that they form a joint plastic part is particularly advantageous.

In a preferred embodiment of the invention, the locking device has interacting first and second locking members which are movable relative to one another between a released position in which the sealing element is movable in the axial direction relative to the first sealing surface and a locked position in which the sealing element is held on the first sealing surface so as to be immovable at least in the axial direction. Therefore, when inserting the filter element into the filter housing, the sealing element can be easily made to lie in a sealing manner on the first sealing surface by the locking members being moved relative to one another from a released position to a locked position. If the filter element is to be removed from the filter housing, it is merely necessary for the locking members to be moved relative to one another into their released position as the lying of the sealing element in a sealing manner on the associated first sealing surface can then be released and the filter element withdrawn from the filter housing.

The filter element is expediently adapted to be inserted into the filter housing along a longitudinal axis of the filter housing with the locking members in the released position, and the locking members are adapted to be transferred to their locked position by rotating the filter element inserted in the filter housing about the longitudinal axis of the filter housing.

It is advantageous for the locking device to have at least two second locking members which are arranged in spaced relation to each other in the circumferential direction of the filter element and form between them a free space for passage of a first locking member therethrough upon inserting the filter element into the filter housing. In particular, it may be provided that a plurality of spaced first locking members are used, which are each adapted to pass through a free space between two second locking members. The number, shape, contour and/or position of the first locking members may be adapted to the respectively associated free space between two second locking members. It can thereby be ensured in a constructionally simple way that only the filter elements that match the filter housing can be inserted into it, i.e., in particular, filter elements that have the filter quality required for the specific purpose, in order to avoid damage to the hydraulic system. Therefore, the locking device not only ensures fixing of the sealing element on the associated first sealing surface such that it is immovable at least in the axial direction, but, in addition, it forms a kind of code in the manner of a key-lock principle with which it can be ensured in a simple way that only the matching filter element can be inserted in such a way into the filter housing that the dirt area is then reliably sealed off from the clean area of the filter device.

In a preferred embodiment of the invention, a reliable locking of the sealing element on the first sealing surface is ensured by the at least one first locking member engaging in the locked position under a second locking member.

As mentioned above, the filter element preferably comprises a filter material through which the liquid flows in a radial direction, and the filter material has an end plate arranged at its upper and/or lower end face. It is expedient for at least one first or one second locking member to be arranged on an end plate.

The at least one first or second locking member is preferably connected with a substance-to-substance bond or integrally to the end plate. For example, the at least one first or second locking member may be adhesively bonded or welded to the end plate. It may also be provided that at least one first or second locking member is integrally connected to the end plate, and, in particular, it may be provided that the locking member forms together with the end plate a one-part plastic molded part.

In particular, in order to reduce the manufacturing costs, it is expedient for the at least one first or second locking member to be integrally connected to the first sealing surface or the sealing element. For example, the at least one first or second locking member may form together with the sealing surface or the sealing element and an end plate of the filter element a one-part plastic molded part.

When inserting the filter element into the filter housing, in order to achieve a definite positioning of the sealing element on the associated first sealing surface in a simple way, it is advantageous for the locking device to have at least one guide surface inclined in the axial direction along which a first and/or second locking member slides while carrying out an axial movement during the transition from the released position to the locked position. The guide surface thus forms a compulsory guide for the first and/or second locking members in such a way that during the transition from the released position to the locked position these are displaced so far in the axial direction that the first sealing surface coupled with the first or second locking members or the sealing element coupled with the first or second locking elements assumes a definite position relative to the sealing element or relative to the first sealing surface, respectively. To this end, it may be provided that the first sealing surface or the sealing element is rigidly connected to the at least one first or second locking member.

Preferably, a guide surface is arranged on the underside of at least one second locking member, and a first locking member is adapted to be displaced along the guide surface during the transition from the released position to the locked position. For example, it may be provided that a first locking member may be passed in the axial direction through a free space between two second locking members and then displaced along a guide surface arranged on the underside of a second locking member during the transition from its released position to its locked position. In the locked position, the first locking member therefore assumes a position under a second locking member, so that it is unable to be moved upwards again in the axial direction towards the insertion opening of the filter housing through which the filter element is insertable into the housing.

In a particularly preferred embodiment of the filter device according to the invention, the locking device forms a bayonet connection. This comprises bayonet wings in the form of the first and second locking members which engage under one another in the locked position.

It is advantageous for the filter device to have at least one stop element. By means of the stop element, a definite position can be prescribed for the filter element and therefore also for the sealing element relative to the associated first sealing surface. When inserting the filter element into the filter housing, a sealing-off of the dirt area from the clean area can thereby be ensured in a simple way.

Preferably, the at least one stop element is positionable on a first or second locking member. Therefore, upon inserting the filter element into the filter housing, the stop element strikes a first or second locking member and thereby prescribes a definite position for the sealing element relative to the sealing surface.

It is expedient for the filter device to have a plurality of stop elements arranged in spaced relation to one another in the circumferential direction of the filter element. For example, the stop elements may be configured as radial projections. They may extend in the circumferential direction along a partial area of the filter element, and they may be arranged on the filter element or also on the inner side of the filter housing.

Preferably, in the locked position, at least one second locking member is arranged in the axial direction between a stop element and a first locking member. The second locking member is therefore received in the axial direction between a first locking member and a stop element. It is thereby ensured in a constructionally simple way that the second locking member in its locked position is unable to be moved upwards in the axial direction, i.e., in the direction towards the insertion opening of the filter housing, or downwards in the direction facing away from the insertion opening relative to the first locking member.

In an embodiment of the filter device according to the invention having a particularly high mechanical load capacity, a plurality of first locking members arranged in spaced relation to one another in the circumferential direction of the filter element and a plurality of stop elements arranged in axially and circumferentially offset relation to the first locking members are used.

In a preferred embodiment, the at least one stop element is arranged on an end plate of the filter element, for example, on the upper end plate facing the inlet of the filter housing.

Alternatively, it may, for example, be provided that the at least one stop element is positioned on the lower end plate of the filter element that faces away from the inlet.

It is expedient for the at least one stop element to be connected with a substance-to-substance bond or integrally to the end plate. In particular, it may be provided that the at least one stop element is adhesively bonded or welded to the end plate. Alternatively, a one-part configuration of the at least one stop element in combination with the end plate may be used in the form of a one-part plastic molded part.

As explained above, by providing a locking device it can be ensured in a simple way that the sealing element assumes a prescribable and axially immovable position relative to the associated first sealing surface after insertion of the filter element into the filter housing. To enable reduction of the manufacturing costs of the filter device and, in particular, avoidance of subsequent machining of the filter housing, it is advantageous for a supporting ring comprising the first sealing surface or the sealing element to be held in the filter housing. The supporting ring may be inserted into the filter housing when assembling the filter device and, for example, comprise the first sealing surface. Therefore, standard filter housings may be used without these having to be adapted to a certain filter element. For adaptation to a certain filter element, it is merely necessary to insert into the filter housing a supporting ring that is associated with the filter element. For example, the supporting ring may then comprise the first sealing surface, and the associated sealing element may be arranged on the matching filter element. Alternatively, it may, of course, also be provided that the supporting ring comprises the sealing element, and the associated sealing surface is arranged on the filter element.

Preferably, the supporting ring is held so as to be exchangeable in the filter housing. This makes it possible to exchange the supporting ring when required. In this way, a filter element with a first constructional design can first be held in a filter housing by means of a matching supporting ring with sealing-off of the dirt area from the clean area being ensured. After use, this filter element may be withdrawn from the filter housing, and the associated supporting ring may also be removed. In its place, there can then be inserted into the filter housing a supporting ring which corresponds to another filter element, which may then be used.

It is particularly advantageous for the supporting ring to be held together with the filter element for movement in the axial direction in the filter housing with the sealing element continuing to lie in a sealing manner on the first sealing surface. The supporting ring can therefore be displaced together with the filter element in the axial direction in the filter housing without any impairment to the lying of the sealing element in a sealing manner on the first sealing surface. Such a configuration makes tolerance compensation possible by filter elements of different lengths being able to be inserted into the filter housing as the different lengths of the filter elements can be compensated by the displaceably held supporting ring without any impairment to the lying of the sealing element in a sealing manner on the first sealing surface. The tolerance requirements in the manufacture of the filter element can thereby be kept low. As a result, its manufacturing costs can be reduced.

In a preferred embodiment of the invention, a sealing ring adapted to be positioned in a sealing manner on a second sealing surface is arranged between the supporting ring and the filter housing. In this connection, it is expedient for the sealing ring to have a sealing lip.

For example, the sealing ring may be arranged in a ring groove of the supporting ring.

The second sealing surface is preferably formed by a hollow which is turned out of the filter housing. In the area of the turned-out hollow, the filter housing may have a high-quality surface finish with a slight roughness depth, whereas a high-quality surface finish may be dispensed with in the other areas of the filter housing.

Expediently, the supporting ring is held in the filter housing so as to be non-rotatable about the longitudinal axis of the filter housing. Therefore, the supporting ring is displaceable in the axial direction relative to the filter housing, but it is unable to be moved in the circumferential direction relative to the filter housing.

For example, it may be provided that at least one radial projection is arranged on the supporting ring and/or on the filter housing and enters a recess arranged on the filter housing and/or on the supporting ring. The at least one recess serves in combination with the projection entering it to secure the supporting ring against rotation.

It is particularly advantageous for the sealing element or the first sealing surface to be arranged on the supporting ring, and for at least one first or second locking member to be arranged in axially spaced relation to the sealing element or the first sealing surface. For example, it may be provided that the supporting ring forms a ring wall which surrounds the filter element in the circumferential direction and in an upper end area comprises the sealing element or the first sealing surface and in a lower end area at least one first or second locking member.

It is advantageous for the supporting ring to be of double-walled construction with two ring walls aligned coaxially with each other and rigidly connected to each other, the sealing element or the first sealing surface and at least one first or second locking member being arranged on the inner ring wall, and attachment elements for attachment of the supporting ring to the filter housing being positioned on the outer ring wall. Furthermore, the outer ring wall may comprise the above-mentioned ring groove for receiving a sealing ring adapted to be positioned in a sealing manner on the second sealing surface.

Preferably, the at least one first or second locking member is connected with a substance-to-substance bond or integrally to the supporting ring. For example, it may be provided that the at least one first or second locking member is adhesively bonded or welded to the supporting ring. It is particularly advantageous for the at least one first or second locking member to form in combination with the supporting ring a one-part plastic molded part.

It has proven particularly advantageous for the first sealing surface and at least one first or second locking member to be arranged on the supporting ring and for at least one depression extending obliquely or perpendicularly to the circumferential direction to be arranged between the first sealing surface and the at least one first or second locking member on the supporting ring. The spacing between the first sealing surface and the at least one first or second locking member may correspond to the spacing of the sealing element associated with the first sealing surface from the stop element positionable on the at least one first second locking member, so that it is only ensured that the sealing element lies in a sealing manner on the first sealing surface when the aforementioned spacings correspond to one another, as it is otherwise not possible for the sealing element to lie in a sealing manner on the first sealing surface owing to the depression arranged between the first sealing surface and the first or second locking member. The sealing element and the at least one stop element may be arranged on the filter element, so that it is ensured in a simple way that only a filter element associated with the respective supporting ring may be inserted into the filter housing. Therefore, by choosing the spacing between the first sealing surface and the at least one first or second locking member, which are arranged on the supporting ring, a code is obtainable, so that it is ensured that only matching filter elements having the filter quality required for the specific purpose can be used.

It is particularly expedient for the first sealing surface and the at least one first or second locking member to be arranged on end areas of the supporting ring facing away from each other. For example, the first sealing surface may be arranged on an upper end area, the at least one first or second locking member may be positioned on a lower end area of the supporting ring.

As explained above, the supporting ring is insertable into the filter housing. In this connection, it is expedient for it to be adapted to be latched to the filter housing. To this end, interacting latching elements may be used, for example, latching wings arranged and, in particular, formed, on the supporting ring, which enter a latching receptacle formed in the filter housing.

As mentioned at the outset, the invention also relates to a filter element for a filter device of the kind mentioned above. The filter element comprises a filter material through which a liquid, in particular, hydraulic oil, flows in a radial direction, the filter material having an end plate arranged at its upper and/or lower end face, and a first sealing surface or a sealing element adapted to be positioned in a sealing manner on a first sealing surface being held on an end plate. In order to ensure in a simple way that the sealing element also lies reliably on the first sealing surface under alternating pressure loads, at least one first locking member is arranged on an end plate and interacts with a second locking member of the filter device to lock the sealing element at least in the axial direction relative to the first sealing surface. Therefore, when the filter element is in the operating position, an axial movement of the sealing element relative to the first sealing surface can be avoided in a simple way.

Preferably, the at least one first locking member and/or the first sealing surface or the sealing element are connected with a substance-to-substance bond or integrally to the upper or lower end plate of the filter element. For example, the at least one locking member and/or the sealing element may be adhesively bonded or welded to the upper or lower end plate. It is particularly advantageous for the first locking member and/or the sealing element to form in combination with the upper or lower end plate a one-part plastic molded part.

In a preferred embodiment of the filter element according to the invention, at least one stop element is arranged in the axial direction between the first sealing surface or the sealing element and the at least one first locking member. When inserting the filter element into the filter housing, a defined position relative to the sealing surface can be prescribed for the sealing element by means of the stop element. In particular, it may be provided that when the filter element is in the operating position, the stop element is positionable on a second locking member arranged in the filter housing.

Advantageously, the filter element has a plurality of first locking members arranged in spaced relation to one another in the circumferential direction and a plurality of stop elements arranged in axially and circumferentially offset relation to the first locking members. The number, shape, contour and/or position of the first locking members may be adapted to the number, shape, contour and/or position of free spaces between two second locking members arranged in the filter housing, so that only filter elements with the matching configuration of the first locking members may be inserted into the filter housing. Furthermore, the axial spacing between the first locking members and the stop elements may be adapted to the axial extent of the second locking members arranged in the filter housing, which, upon inserting the filter element into the filter housing, are received by the space between the stop elements and the first locking members. The stop elements can then sit on the second locking members, and the first locking members can be positioned on the underside of the second locking members.

The following description of a preferred embodiment of the invention serves in conjunction with the drawings for a more detailed explanation.

DETAILED DESCRIPTION OF THE INVENTION

A filter device designated in its entirety by reference numeral 10 is shown schematically in the drawings. This filter device comprises a filter housing 12 with a substantially cylindrical filter head 14 which has a likewise cylindrically formed filter pot 16 connected in the axial direction thereto, and, on its upper end face, facing away from the filter pot 16, an insertion opening 17 which can be closed fluid-tightly by means of a cover which is not shown in the drawings. The filter head has in its side wall 18 an inlet 20 for feeding in hydraulic fluid to be filtered and an outlet 22 for discharging filtered hydraulic fluid. Connected on the outside to the inlet 20 is an inlet connection piece 24, from which there branches off on the outside of the side wall 18 a bypass line 28 which is oriented parallel to the longitudinal axis 26 of the filter housing 12 and carries at its free end, which is not shown in the drawings, in the usual manner, a bypass valve in the form of a spring-loaded non-return valve.

Figure 1:
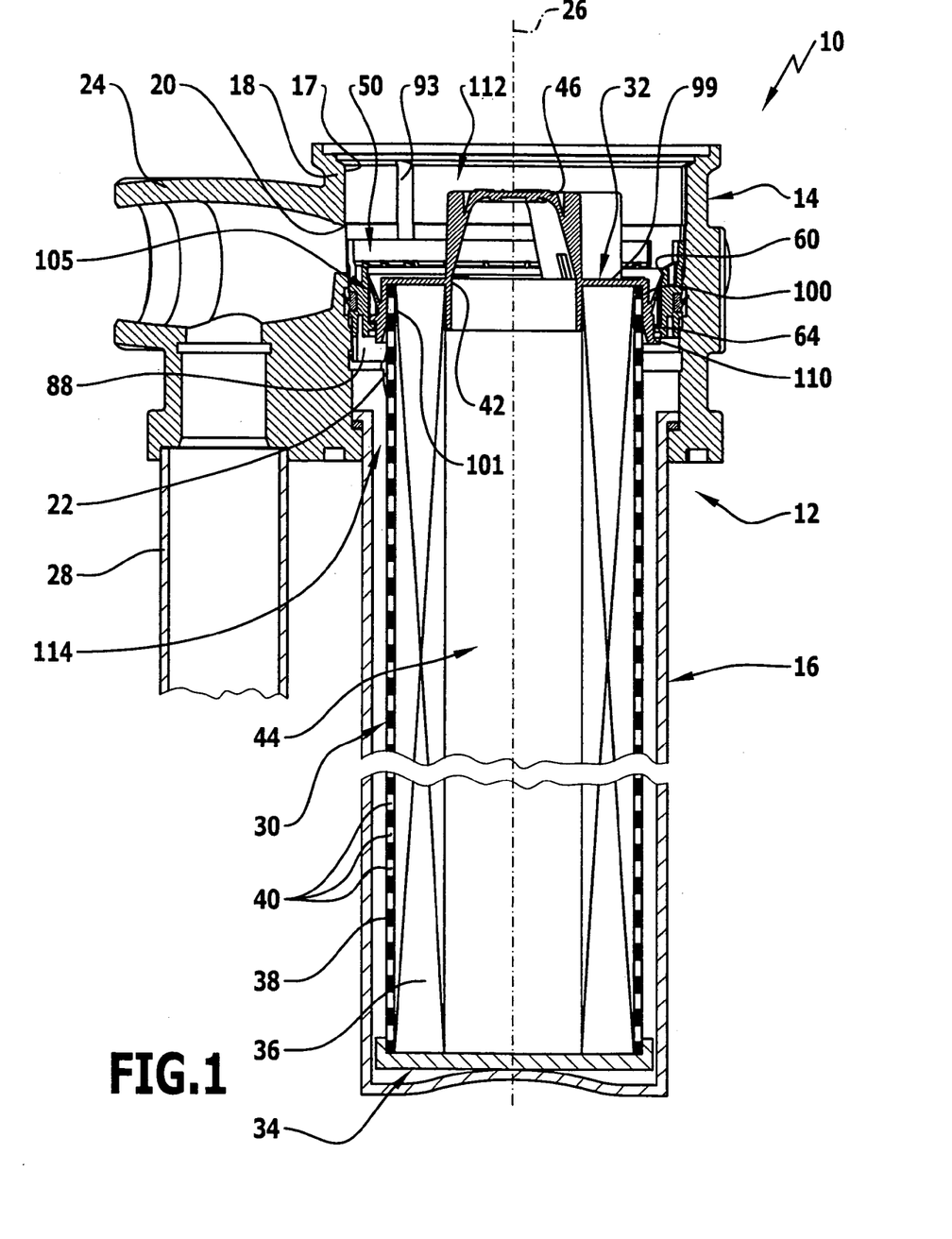
FIG. 1 shows a schematic longitudinal section of a filter device according to the invention with a filter head and a filter pot, a supporting ring and a filter element with an upper end plate being inserted in the filter device.

The filter housing 12 surrounds a filter element 30, which is insertable into the filter housing 12 through the insertion opening 17 and is exchangeable when required. The filter element 30 is of cylindrical design and has on its upper side facing the insertion opening 17 an upper end plate 32. On its underside facing away from the insertion opening 17, the filter element 30 has a lower end plate 34. Arranged between the upper end plate 32 and the lower end plate 34 is a filter material 36 which carries on its outer side a supporting pipe 38 with a plurality of through-openings 40. The filter material 36 is folded in the usual way in the shape of a star, and the hydraulic fluid can flow through it in a radial direction from the inside to the outside. The hydraulic fluid can flow in from the inlet 20 through a central inflow opening 42 in the upper end plate 32 into the interior 44 of the filter material 36, which is surrounded by the filter material 36. From the interior 44, the hydraulic fluid can then flow in a radial direction through the filter material 36 and the supporting pipe 38 so as to finally reach the outlet 22. The interior 44 is closed off on the underside by the lower end plate 34.

On the upper side, the upper end plate 32 is connected to a grip 46 of the filter element 30, which is integrally joined to the upper end plate 32.

Figure 2:
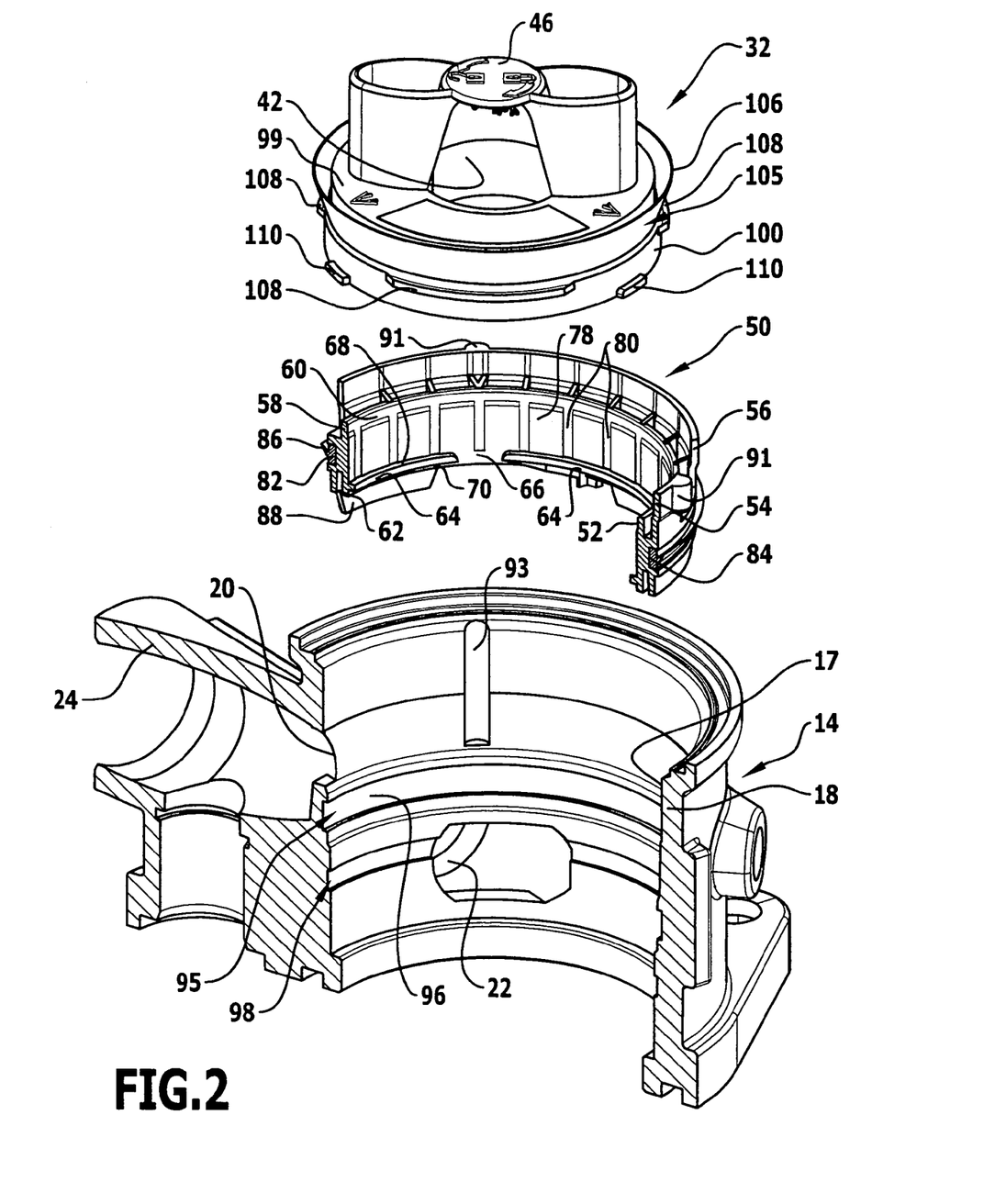
FIG. 2 shows a partially sectional perspective view of the upper end plate, the supporting ring and the filter head in the manner of an exploded drawing.
Figure 3:
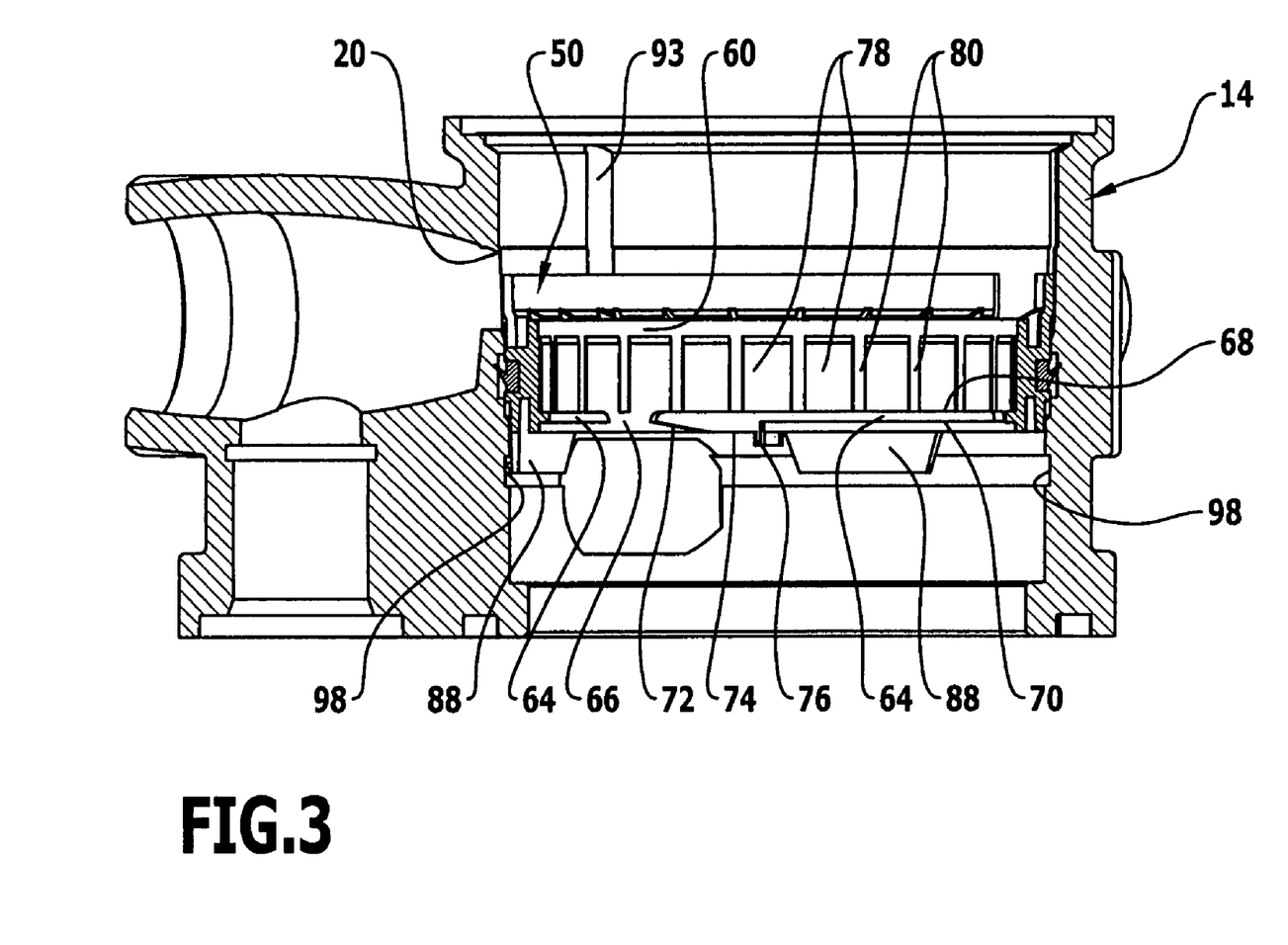
FIG. 3 shows a sectional view of the filter head with the supporting ring inserted.

The upper end plate 32 is surrounded in the circumferential direction by a supporting ring 50 which like the upper end plate 32 is in the form of a one-part plastic molded part. The supporting ring 50 has an inner cylinder wall 52 and an outer cylinder wall 54, which are aligned coaxially with the longitudinal axis 26 and are integrally joined to each other approximately midway in the longitudinal direction. The outer cylinder wall 54 is of longer construction than the inner cylinder wall 52 so that it projects with its upper end portion 56 facing the insertion opening 17 over the inner cylinder wall 52. With its upper end portion 58 facing the insertion opening 17, the inner cylinder wall 52 forms on the inside a first sealing surface 60, and at its lower end portion 62 facing away from the insertion opening 17, the inner cylinder wall 52 carries a total of three second locking members 64, each extending over a partial area in the circumferential direction of the filter element 30. The second locking members 64 are arranged in spaced relation to one another in the circumferential direction and form between them a total of three free spaces 66. The upper sides 68 of the second locking members 64 are arranged in a plane aligned perpendicularly to the longitudinal axis 26, i.e., they extend perpendicularly to the longitudinal axis 26. The undersides 70 of the second locking members 64 each have, starting from a free space 66, a guide surface 72, which is formed in the manner of a ramp and is inclined in relation to the longitudinal axis 26. Connected to the guide surface 72 in the circumferential direction is a locking portion 74, which is aligned perpendicularly to the longitudinal axis 26 and carries at its end facing away from the guide surface 72 an axially aligned end stop 76 protruding in the shape of a peg from the underside 70 of the respective second locking member 64.

Between the first sealing surface 60 and the second locking members 64, the inner cylinder wall 52 has a plurality of elevations 78, between each of which a depression 80 extending perpendicularly to the circumferential direction and therefore parallel to the longitudinal axis 26 is arranged.

The outer cylinder wall 54 has on the outside a ring groove 82 in which a sealing ring 84 is arranged with an outwardly directed sealing lip 86 which is aligned obliquely in relation to the longitudinal axis 26 and is inclined upwards towards the insertion opening 17. Connected to the outer cylinder wall 54 on the underside are a total of three latching wings 88 which are uniformly distributed in the circumferential direction and each carry at their free end an outwardly directed latching nose 89. The latching wings 88 are integrally joined to the outer cylinder wall 54 and with their free end, at which a latching nose 89 is arranged, are elastically deformable in a radial direction.

In its upper end portion 56 projecting upwards over the inner cylinder wall 52, the outer cylinder wall 54 has on the outside a total of three radial projections 91 distributed uniformly in the circumferential direction, which are configured like a lobe in the form of a half cylinder. Only two of the projections 91 are recognizable in the drawings.

When assembling the filter device 10, the supporting ring 50 can be inserted in the axial direction through the insertion opening 17 into the filter head 14, whereupon the radial projections 91 are each received by a recess 93 formed on the inside in the side wall 18. The recess 93 extends like a groove from the insertion opening 17 in the axial direction and ends above a ring-shaped hollow 95 formed by turning, which forms a second sealing surface 96. The second sealing surface 96 is associated with the sealing ring 84 and serves for the sealing lip 86 to lie in a sealing manner thereon. At an axial spacing from the turned-out hollow 95, the side wall 18 has below the turned-out hollow 95 a ring-shaped latching receptacle 98 into which the latching noses 89 of the latching wings 88 can snap upon inserting the supporting ring 50 into the filter head 14. The latching receptacle 98 in the form of a U-shaped groove extends in the longitudinal direction over a considerably larger area than the latching noses 89. As a consequence, the supporting ring 50 can be displaced in the axial direction with the sealing ring 84 continuing to lie in a sealing manner on the second sealing surface 96, whereas a rotational movement of the supporting ring 50 about the longitudinal axis 26 relative to the filter head 14 is prevented by the projections 91 being received with a positive connection in the respectively associated recess 93. The projections 91 in combination with the recesses 93 therefore secure the supporting ring 50 against rotational movement.

Figure 4:
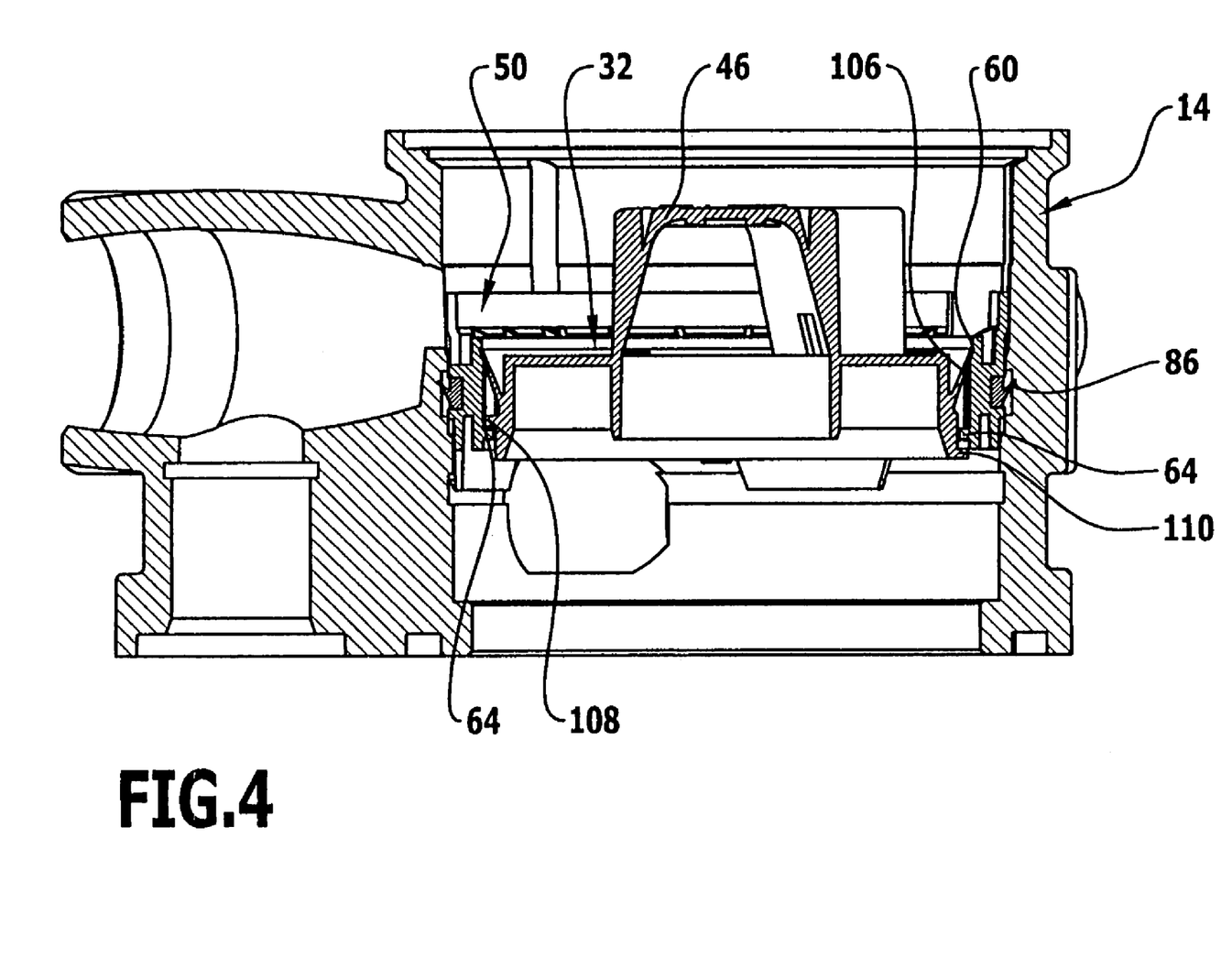
FIG. 4 shows a sectional view of the filter head with the supporting ring inserted and the upper end plate inserted.

The filter element 30 can be fixed to the supporting ring 50. To this end, the upper end plate 32 has a cylindrical casing 100 projecting downwards from an end wall 99. The casing 100 surrounds an upper end portion 101 of the supporting pipe 38 in the circumferential direction and carries on the outside a ring-shaped sealing element 105 in the form of an outwardly directed sealing lip 106 oriented obliquely in relation to the longitudinal axis 26 and inclined towards the insertion opening 17. Below the sealing lip 106, the casing 100 has on the outside three radially projecting stop elements 108 which are arranged in spaced relation to each other and are uniformly distributed in the circumferential direction. Offset axially and in the circumferential direction in relation to the stop elements 108, the casing 100 carries on the outside three first locking members 110 which in the circumferential direction are each slightly shorter than the free spaces 66 formed between the second locking members 64 of the supporting ring 50. This makes it possible to pass the filter element 30 through the supporting ring 50 until the casing 100 is arranged at the level of the supporting ring 50. The first locking members 110 can each be passed through a free space 66, and the stop elements 108 then strike the upper sides 68 of the second locking members 64, so that the inserting movement of the filter element 30 is delimited by the stop elements 108 seated on the second locking members 64. The filter element 30 can then be rotated about the longitudinal axis 26 inside the supporting ring 50, whereupon the first locking members 110, starting from the respective free space 66, slide along the guide surface 72 of a second locking member 64 so as to then reach the locking portion 74 where the rotational movement of the filter element 30 is limited by the respective end stop 76 which a locking member 110 strikes.

Figure 5:
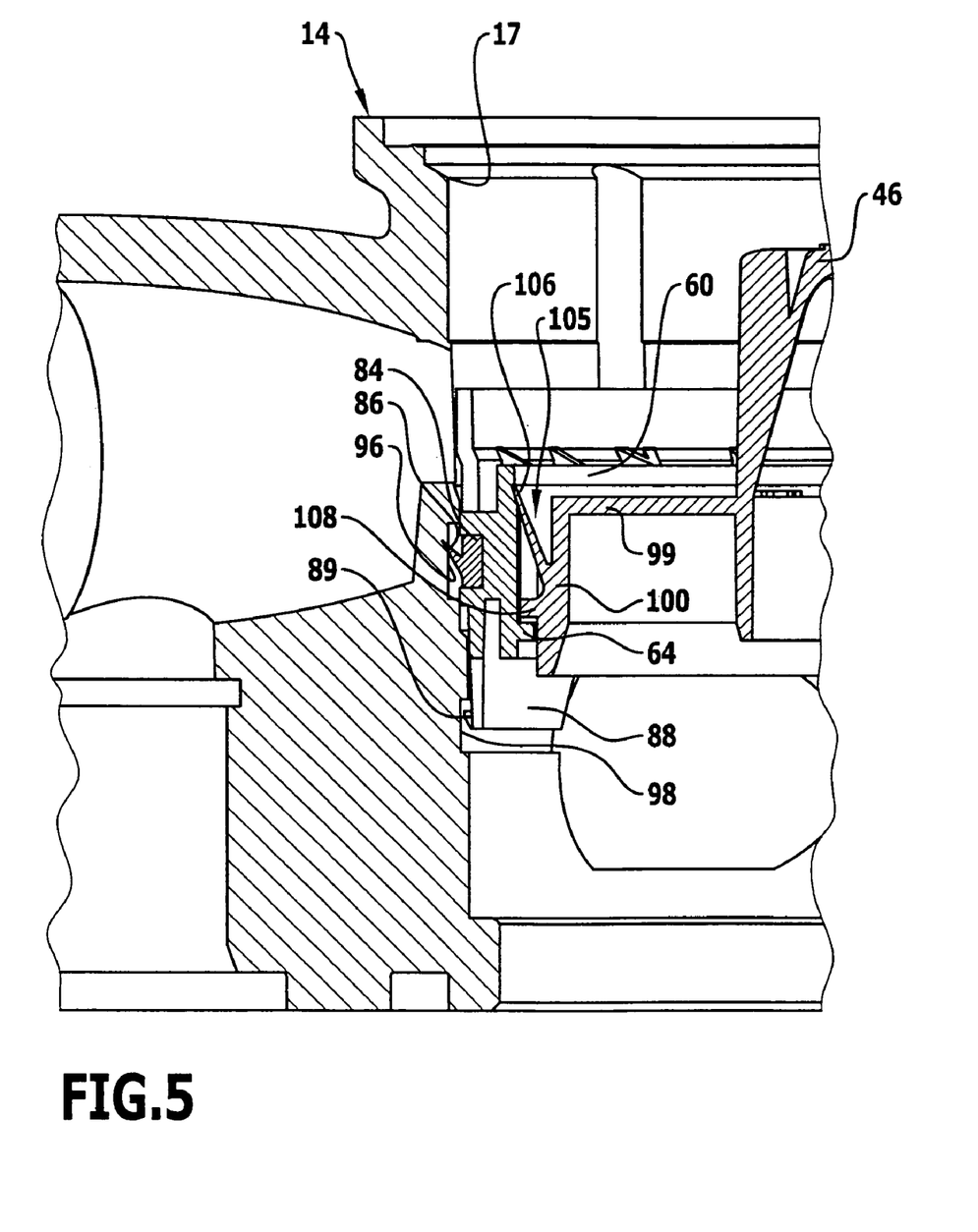
FIG. 5 shows an enlarged sectional view of a partial area of the filter head with the supporting ring inserted and the upper end plate inserted.

The spacing between the first locking members 110 and the sealing lip 106 is so selected that the sealing lip 106 lies in a sealing manner on the first sealing surface 60 of the supporting ring 50 after the first locking members 110 have reached the respective locking portion 74. In this locked position, the filter element 30 is held immovably on the supporting ring 50, and the sealing lip 106 lies in a sealing manner on the first sealing surface 60. However, the filter element 30 can be moved together with the supporting ring 50 in the axial direction relative to the filter housing 12 with the sealing lip 106 continuing to lie in a sealing manner on the first sealing surface 60, and the sealing ring 84 held on the outside on the supporting ring 50 lying with its sealing lip 86 in a sealing manner on the second sealing surface 96.

If the filter element 30 is to be exchanged, it can be turned with the grip 46, starting from the locked position described above, about the longitudinal axis 26 until the first locking members 110 reach the respective free space 66, and the filter element 30 can then be removed in the axial direction from the supporting ring 50 and the filter housing 12.

The first locking members 110 therefore form in combination with the second locking members 64 a bayonet connection by means of which the filter element 30 can be held on the supporting ring 50. The number and shape of the first locking members 110 must be adapted to the number and shape of the free spaces 66 as the filter element 30 can otherwise not be inserted into the supporting ring 50. Also, the spacing of the first locking members 110 from the sealing lip 106 must correspond to the spacing between the second locking members 64 and the first sealing surface 60 of the supporting ring 50. Otherwise it is not sure that the sealing lip 106 lies in a sealing manner on the first sealing surface 60. By inserting a certain supporting ring 50 into the filter head 14, use of a filter element 30 corresponding to the supporting ring 50 can thus be ensured and, therefore, in a constructionally simple way, with the design of the filter housing 12 otherwise being identical, it is guaranteed that filter elements 30 that are optimally suited for the specific purpose are used. Filter elements 30 that are not adapted to this purpose, which means to the respective supporting ring 50, cannot be used.

The first locking members 110 form in combination with the second locking members 64 a locking device which, in addition, ensures that the sealing lip 106 also continues to lie in a sealing manner on the first sealing surface 60 when the filter element 30 is under considerable alternating pressure loads. It is thus also ensured under high alternating pressure loads that hydraulic oil flowing through the inlet 20 into the dirt area 112 of the filter device 10, which is arranged upstream of the filter element 30, cannot bypass the filter element 30 and reach the clean area 114 of the filter device 10, which is arranged downstream of the filter element 30, directly.

In the embodiment of the invention described in detail above, the supporting ring 50 is arranged at the level of the upper end plate 32. However, the invention is not limited to such a configuration. It may also be provided that the supporting ring 50 is arranged at the level of the lower end plate 34 whose configuration then corresponds to that of the upper end plate 32. Such a configuration is, for example, of advantage when the liquid flows through the filter element 30 radially from the outside to the inside.

The invention claimed is:

1. Filter device for filtering a liquid, comprising:
a filter housing having a least one inlet for liquid to be filtered and at least one outlet for filtered liquid,
a filter element positioned in a flow path of the liquid between the at least one inlet and the at least one outlet,
a sealing device having at least one sealing element and a first sealing surface associated with the sealing element,
the sealing element in a sealing position being positioned in a sealing manner on the first sealing surface for sealing off a dirt area arranged upstream of the filter element for liquid to be filtered from a clean area arranged downstream of the filter element for filtered liquid, and
a locking device, the sealing element being adapted to be locked in the sealing position at least in an axial direction relative to the first sealing surface by means of the locking device;
wherein:
a supporting ring comprising the first sealing surface or the sealing element is held in the filter housing; and
the supporting ring is held together with the filter element for movement in the axial direction in the filter housing with the sealing element continuing to lie in a sealing manner on the first sealing surface.

2. Filter device in accordance with claim 1, wherein the sealing element is adapted to be clamped to the first sealing surface by means of the locking device.

3. Filter device in accordance with claim 1, wherein the sealing element has a sealing lip.

4. Filter device in accordance with claim 1, wherein the filter element comprises a filter material through which the liquid flows in a radial direction, the filter material having an end plate arranged at an upper and/or lower end face, and the first sealing surface or the sealing element is arranged on the end plate.

5. Filter device in accordance with claim 4, wherein the first sealing surface or the sealing element is connected with a substance-to-substance bond or integrally to the end plate.

6. Filter device in accordance with claim 4, wherein a first end plate faces the inlet, and the second end plate faces away from the inlet, and the first sealing surface or the sealing element is arranged on the first end plate facing the inlet.

7. Filter device in accordance with claim 1, wherein the locking device has interacting first and second locking members which are movable relative to one another between a released position in which the sealing element is movable in the axial direction relative to the first sealing surface and a locked position in which the sealing element is held on the first sealing surface so as to be immovable at least in the axial direction.

8. Filter device in accordance with claim 7, wherein the filter element is adapted to be inserted into the filter housing along a longitudinal axis of the filter housing with the locking members in the released position, and the locking members are adapted to be transferred to the locked position by rotating the filter element inserted in the filter housing about the longitudinal axis of the filter housing.

9. Filter device in accordance with claim 7, wherein the locking device has as least two second locking members which are arranged in spaced relation to each other in a circumferential direction of the filter element and form between them a free space for passage of a first locking member therethrough upon inserting the filter element into the filter housing.

10. Filter device in accordance with claim 7, wherein in the locked position at least one of the first locking members engages under one of the second locking members.

11. Filter device in accordance with claim 7, wherein the filter element comprises a filter material through which the liquid flows in a radial direction, the filter material having an end plate arranged at an upper and/or lower end face, and at least one first or one second locking member is arranged on the end plate.

12. Filter device in accordance with claim 11, wherein the at least one first or second locking member is connected with a substance-to-substance bond or integrally to the end plate.

13. Filter device in accordance with claim 12, wherein the at least one first or second locking member is connected with a substance-to-substance bond or integrally to the first sealing surface or the sealing element.

14. Filter device in accordance with claim 7, wherein the locking device has at least one guide surface inclined in the axial direction, the first and/or second locking members being adapted to slide along the guide surface while carrying out an axial movement during a transition from the released position to the locked position.

15. Filter device in accordance with claim 14, wherein the at least one guide surface along which a first locking member is adapted to be displaced during the transition from the released position to the locked position is arranged on an underside of at least one second locking member.

16. Filter device in accordance with claim 1, wherein the locking device forms a bayonet connection.

17. Filter device in accordance with claim 1, wherein the filter device has at least one stop element.

18. Filter device in accordance with claim 17, wherein the at least one stop element is adapted to be positioned on a first or second locking member.

19. Filter device in accordance with claim 17, wherein the filter device has a plurality of stop elements arranged in spaced relation to one another in a circumferential direction of the filter element.

20. Filter device in accordance with claim 17, wherein in a locked position at least one second locking member is arranged in the axial direction between a stop element and a first locking member.

21. Filter device in accordance with claim 20, wherein the filter device has a plurality of first locking members arranged in spaced relation to one another in a circumferential direction of the filter element and a plurality of stop elements arranged in axially and circumferentially offset relation to the first locking members.

22. Filter device in accordance with claim 17, wherein the at least one stop element is arranged on an end plate of the filter element.

23. Filter device in accordance with claim 22, wherein the at least one stop element is connected with a substance-to-substance bond or integrally to the end plate.

24. Filter device in accordance with claim 1, wherein a sealing ring adapted to be positioned in a sealing manner on a second sealing surface is arranged between the supporting ring and the filter housing.

25. Filter device in accordance with claim 24, wherein the sealing ring has a sealing lip.

26. Filter device in accordance with claim 24, wherein the sealing ring is arranged in a ring groove of the supporting ring.

27. Filter device in accordance with claim 24, wherein the second sealing surface is formed by a hollow which is turned out of the filter housing.

28. Filter device in accordance with claim 1, wherein the supporting ring is held in the filter housing so as to be non-rotatable about a longitudinal axis of the filter housing.

29. Filter device in accordance with claim 28, wherein at least one radial projection is arranged on the supporting ring and/or on the filter housing and enters a recess arranged on the filter housing and/or on the supporting ring.

30. Filter device in accordance with claim 1, wherein the sealing element or the first sealing surface is arranged on the supporting ring, and at least one first or second locking member is arranged in axially spaced relation to the sealing element or the first sealing surface.

31. Filter device in accordance with claim 30, wherein the at least one first or second locking member is connected with a substance-to-substance bond or integrally to the supporting ring.

32. Filter device in accordance with claim 30, wherein at least one depression extending obliquely or perpendicularly to a circumferential direction is arranged between the first sealing surface and the at least one first or second locking member.

33. Filter device in accordance with claim 1, wherein the supporting ring is adapted to be latched to the filter housing.

34. Filter device in accordance with claim 1, wherein:
the filter element comprises a filter material through which the liquid flows in a radial direction,
the filter material has an end plate arranged at an upper and/or lower end face,
the first sealing surface or the sealing element is held on an end plate, and
at least one first locking member which interacts with a second locking member of the filter device to lock the sealing surface or the sealing element at least in the axial direction is arranged on the end plate.

35. Filter device in accordance with claim 34, wherein the at least one first locking member and/or the first sealing surface or the sealing element are connected with a substance-to-substance bond or integrally to the upper or lower end plate.

36. Filter device in accordance with claim 34, wherein at least one stop element is arranged in the axial direction between the first sealing surface or the sealing element and the at least one first locking member.

37. Filter device in accordance with claim 36, wherein the filter element has a plurality of first locking members arranged in spaced relation to one another in a circumferential direction and a plurality of stop elements arranged in axially and circumferentially offset relation to the first locking members.

38. Filter device for filtering a liquid, comprising:
a filter housing having a least one inlet for liquid to be filtered and at least one outlet for filtered liquid,
a filter element positioned in a flow path of the liquid between the at least one inlet and the at least one outlet,
a sealing device having at least one sealing element and a first sealing surface associated with the sealing element,
the sealing element in a sealing position being positioned in a sealing manner on the first sealing surface for sealing off a dirt area arranged upstream of the filter element for liquid to be filtered from a clean area arranged downstream of the filter element for filtered liquid, and
a locking device, the sealing element being adapted to be locked in the sealing position at least in an axial direction relative to the first sealing surface by means of the locking device;
wherein:
the filter element comprises a filter material through which the liquid flows in a radial direction;
the filter material has an end plate arranged at an upper and/or lower end face;
the first sealing surface or the sealing element is arranged on the end plate; and
the first sealing surface or the sealing element is connected with a substance-to-substance bond or integrally to the end plate.

39. Filter device for filtering a liquid, comprising:
a filter housing having a least one inlet for liquid to be filtered and at least one outlet for filtered liquid,
a filter element positioned in a flow path of the liquid between the at least one inlet and the at least one outlet,
a sealing device having at least one sealing element and a first sealing surface associated with the sealing element,
the sealing element in a sealing position being positioned in a sealing manner on the first sealing surface for sealing off a dirt area arranged upstream of the filter element for liquid to be filtered from a clean area arranged downstream of the filter element for filtered liquid, and
a locking device, the sealing element being adapted to be locked in the sealing position at least in an axial direction relative to the first sealing surface by means of the locking device;
wherein:
the filter device has at least one stop element and
the at least one stop element is adapted to be positioned on a first or second locking member.

* * * * *